(12) United States Patent
Zhou et al.

(10) Patent No.: US 12,119,504 B2
(45) Date of Patent: Oct. 15, 2024

(54) ENERGY STORAGE DEVICE AND POWER CONSUMING APPARATUS

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/523,678

(22) Filed: Nov. 29, 2023

(65) Prior Publication Data

US 2024/0274930 A1 Aug. 15, 2024

(30) Foreign Application Priority Data

Feb. 9, 2023 (CN) .......................... 202310091066.5

(51) Int. Cl.
*H01M 50/15* (2021.01)
*H01M 50/16* (2021.01)
(Continued)

(52) U.S. Cl.
CPC ........... *H01M 50/15* (2021.01); *H01M 50/16* (2021.01); *H01M 50/164* (2021.01);
(Continued)

(58) Field of Classification Search
None
See application file for complete search history.

(56) References Cited

U.S. PATENT DOCUMENTS

2015/0295221 A1   10/2015   Urano et al.
2018/0097208 A1   4/2018   Maeda
(Continued)

FOREIGN PATENT DOCUMENTS

CN   112382813 A   2/2021
CN   213026283 U   4/2021
(Continued)

OTHER PUBLICATIONS

WIPO, International Search Report and Written Opinion for International Application No. PCT/CN2023/075265, Sep. 8, 2023, 11 pages.

(Continued)

*Primary Examiner* — Matthew T Martin
*Assistant Examiner* — Ankith R Sripathi
(74) *Attorney, Agent, or Firm* — IP Spring

(57) ABSTRACT

An energy storage device and a power consuming apparatus are provided in the disclosure. In the energy storage device, a top cover defines an opening, a response member covers the opening, a lower plastic member includes a grid structure, the grid structure defines vent holes, and the vent holes are in communication with the opening. A current collecting member includes a first connecting portion and a second connecting portion. The first connecting portion is connected to a terminal, and the second connecting portion is connected to an electrode assembly. Welding protrusions are provided on a surface of the second connecting portion, and the second connecting portion at least partially shelters the grid structure. The grid structure defines a dented avoidance space, and the welding protrusions are accommodated in the avoidance space.

18 Claims, 10 Drawing Sheets

(51) Int. Cl.
  *H01M 50/164* (2021.01)
  *H01M 50/176* (2021.01)
  *H01M 50/342* (2021.01)
  *H01M 50/536* (2021.01)
  *H01M 50/55* (2021.01)
  *H01M 50/578* (2021.01)
  *H01M 50/583* (2021.01)

(52) U.S. Cl.
  CPC ....... *H01M 50/176* (2021.01); *H01M 50/342* (2021.01); *H01M 50/536* (2021.01); *H01M 50/55* (2021.01); *H01M 50/578* (2021.01); *H01M 50/583* (2021.01)

(56) References Cited

U.S. PATENT DOCUMENTS

| 2020/0251694 | A1 | 8/2020 | Wakimoto |
| 2022/0393315 | A1 | 12/2022 | Chen |
| 2022/0416335 | A1 | 12/2022 | Yang et al. |

FOREIGN PATENT DOCUMENTS

| CN | 112820988 A | 5/2021 |
| CN | 213401334 U | 6/2021 |
| CN | 214313345 U | 9/2021 |
| CN | 214898782 U | 11/2021 |
| CN | 215418346 U | 1/2022 |
| CN | 215578767 U | 1/2022 |
| CN | 216055077 U | 3/2022 |
| CN | 216085238 U | 3/2022 |
| CN | 216354490 U | 4/2022 |
| CN | 114914515 A | 8/2022 |
| CN | 115101898 A | 9/2022 |
| CN | 115441105 A | 12/2022 |
| CN | 115588817 A | 1/2023 |
| CN | 115632208 A | 1/2023 |
| WO | 2019165648 A1 | 9/2019 |
| WO | 2020063584 A1 | 4/2020 |
| WO | 2022170488 A1 | 8/2022 |

OTHER PUBLICATIONS

CNIPA, First Office Action for corresponding Chinese Patent Application No. CN202310091066.5, Apr. 28, 2023, 17 pages.
CNIPA, Notification to Grant Patent Right for corresponding Chinese Patent Application No. CN202310091066.5, May 11, 2023, 3 pages.

ENERGY STORAGE DEVICE AND POWER CONSUMING APPARATUS

CROSS-REFERENCE TO RELATED APPLICATION(S)

This application claims priority under 35 U.S.C. § 119(a) to Chinese Patent Application No. 202310091066.5, filed Feb. 9, 2023, the entire disclosure of which is incorporated herein by reference.

TECHNICAL FIELD

The disclosure relates to the technical field of energy storage, and in particular to an energy storage device and a power consuming apparatus.

BACKGROUND

In the related art, a current collecting member of an energy storage device is usually arranged on one side of a lower plastic member, and a side of the current collecting member close to the lower plastic member is provided with welding protrusions. Since the welding protrusions protrude from the current collecting member, during assembly or battery transportation, the lower plastic member presses down against the welding protrusions due to vibrations.

SUMMARY

In view of this, in a first aspect of the disclosure, an energy storage device with a prolonged service life is provided. The energy storage device includes an electrode assembly, an end cover assembly, and a current collecting member. The end cover assembly includes a top cover, a lower plastic member, and a terminal. The terminal is fixed to the top cover. The top cover includes a response member, the top cover defines an opening, and the response member is attached to the top cover and covers the opening. The lower plastic member is arranged between the top cover and the electrode assembly. The lower plastic member includes a first surface facing the top cover and a second surface facing away from the first surface. The lower plastic member includes a grid structure. The grid structure defines vent holes extending through the grid structure in a thickness direction of the grid structure. The grid structure is arranged opposite the response member in the thickness direction of the energy storage device. The vent holes are in communication with the opening. The current collecting member includes a first connecting portion and a second connecting portion connected to the first connecting portion. The first connecting portion is connected to the terminal, and the second connecting portion is connected to the electrode assembly. A surface of the second connecting portion facing the second surface is provided with welding protrusions, and the second connecting portion at least partially shelters the grid structure. The grid structure defines an avoidance space dented from the second surface towards the first surface, and the welding protrusions are accommodated in the avoidance space.

In an implementation, the avoidance space has a first portion, a second portion, and a third portion. The second portion is connected between the first portion and the third portion, a dented depth of the first portion and a dented depth of the third portion are both less than a dented depth of the second portion, and at least part of the welding protrusions faces the second portion in the thickness direction of the energy storage device.

In an implementation, the grid structure includes multiple first grids arranged at intervals in a length direction of the lower plastic member. Every adjacent two of the first grids surround a space to define the vent hole. At least part of each of the first grids is bent away from the current collecting member to define the avoidance space.

In an implementation, each of the multiple first grids includes a bent portion and supporting portions arranged on two opposite sides of the bent portion, and the bent portion is bent away from the current collecting member to form the avoidance space.

In an implementation, the second surface of the lower plastic member defines a recess, the grid structure is arranged in the recess, the first surface of the lower plastic member defines a through hole, the through hole extends through the second surface of the lower plastic member and a bottom wall of the recess, the first grids and side walls of the recess cooperatively define spaces as the vent holes, the supporting portion faces the bottom wall of the recess, and the bent portion faces the through hole.

In an implementation, the top cover defines a first mounting hole, the lower plastic member defines a second mounting hole corresponding to the first mounting hole, the second mounting hole extends through the first surface and the second surface, the terminal extends through the first mounting hole and the second mounting hole, the side walls of the recess away from the second mounting hole have two chamfers arranged opposite each other in a width direction of the lower plastic member, and one end of the second connecting portion away from the first connecting portion faces the two chamfers.

In an implementation, at least part of the supporting portion abuts against the second connecting portion of the current collecting member.

In an implementation, the grid structure further includes a second grid extending in the same direction as the length direction of the lower plastic member, the second grid is connected to the plurality of first grids, two opposite ends of the second grid are both connected to the side walls of the recess, and the second grid is entirely bent away from the current collecting member to define the avoidance space.

In an implementation, the top cover defines a first mounting hole, the lower plastic member defines a second mounting hole corresponding to the first mounting hole, the second mounting hole extends through the first surface and the second surface, the terminal extends through the first mounting hole and the second mounting hole, and in the length direction of the lower plastic member, the one end of the second connecting portion away from the first connecting portion goes beyond one end of the second grid away from the second mounting hole.

In an implementation, the one end of the second connecting portion away from the first connecting portion goes beyond the one end of the second grid away from the second mounting hole by a distance of 1 mm to 12 mm.

In an implementation, the supporting portion is flush with the second surface of the lower plastic member that defines the recess.

In an implementation, an orthographic projection of the current collecting member on the top cover overlaps an orthographic projection of the grid structure on the top cover.

In an implementation, a ratio of a height of the welding protrusions to the maximum dented depth of the grid structure is 0.15-0.95.

In an implementation, the maximum dented depth of the grid structure is 0.05 mm to 1.8 mm.

A power consuming apparatus is provided in a second aspect of the disclosure. The power consuming apparatus includes the energy storage device provided in the first aspect, the energy storage device is configured to power the power consuming apparatus.

BRIEF DESCRIPTION OF THE DRAWINGS

To explain the technical solutions in the implementations of the disclosure more clearly, the accompanying drawings required for the implementations of the disclosure will be described below.

DESCRIPTION OF REFERENCE NUMERALS

Figure 1:
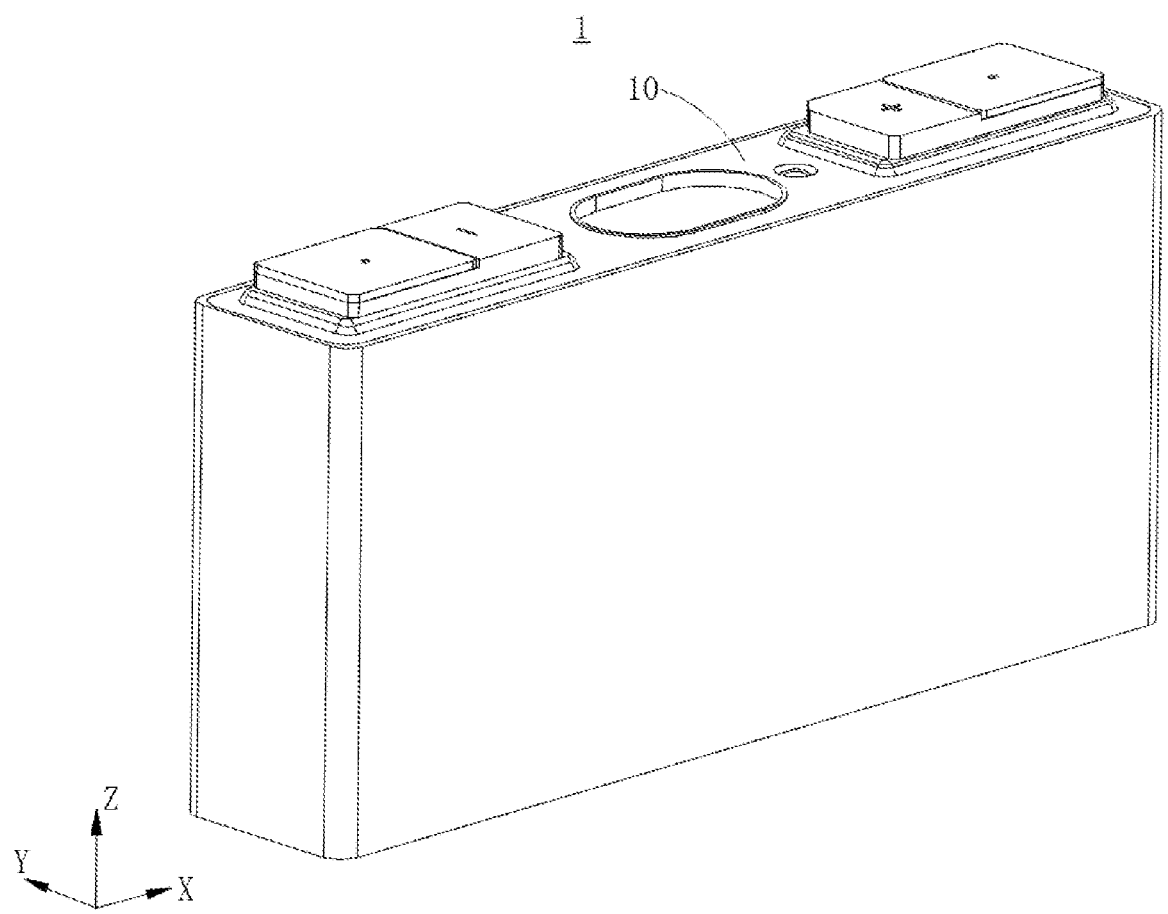
FIG. 1 is a perspective schematic structure diagram of an energy storage device according to an implementation of the disclosure.

Energy storage device—1, end cover assembly—10, lower plastic member—11, first surface—11a, second surface—11b, through hole—110, grid structure—111, vent hole—1110, first grid—1111, bent portion—1111a, supporting portion—1111b, second grid—1112, recess—112, chamfer—1121, avoidance space—113, first portion—113a, second portion—113b, third portion—113c, second mounting hole—114, upper plastic member—12, top cover—13, opening—131, first mounting hole—132, response member—14, terminal—15, current collecting member—20, welding protrusion—201, length direction—X, width direction—Y, thickness direction—Z, first connecting portion—202, second connecting portion—203, electrode assembly—30, cell—40.

DETAILED DESCRIPTION

Implementations of the disclosure are provided below, and it should be noted that for those of ordinary skill in the art, several improvements and modifications may also be made without departing from the principle of the disclosure, and these improvements and modifications are also considered to be within the scope of protection of the disclosure.

Referring to FIGS. 1 to 10, this implementation provides an energy storage device 1. The energy storage device 1 includes an electrode assembly 30, an end cover assembly 10, and a current collecting member 20.

The end cover assembly 10 includes a top cover 13, a lower plastic member 11, and a terminal 15. The terminal 15 is fixed to the top cover 13, the top cover 13 includes a response member 14, the top cover 13 defines an opening 131, and the response member 14 is attached to the top cover 13 and covers the opening 131. The lower plastic member 11 is arranged between the top cover 13 and the electrode assembly 30, the lower plastic member 11 includes a first surface 11a facing the top cover 13 and a second surface 11b facing away from the first surface 11a, the lower plastic member 11 includes a grid structure 111, the grid structure 111 defines vent holes 1110 extending through the structure in a thickness direction Z of the grid structure, the grid structure 111 is arranged opposite the response member 14 in the thickness direction Z of the energy storage device 1, and the vent holes 1110 are in communication with the opening 131.

The current collecting member 20 is provided. The current collecting member 20 includes a first connecting portion 202 and a second connecting portion 203 connected to the first connecting portion 202. The first connecting portion 202 is connected to the terminal 15, and the second connecting portion 203 is connected to the electrode assembly 30. A surface of the second connecting portion 203 facing the second surface 11b is provided with welding protrusions 201, and the second connecting portion 203 at least partially shelters the grid structure 111. The grid structure 111 defines an avoidance space 113 dented from the second surface 11b towards the first surface 11a, and the welding protrusions 201 are accommodated in the avoidance space 113.

It should be noted that the electrode assembly 30 and the current collecting member 20, particularly a tab and the current collecting member 20 are welded by an ultrasonic welding process. The current collecting member 20 and the tab disposed on the current collecting member 20 (collectively referred to as welded parts) are clamped between an upper applicator and a lower applicator, elastic vibration energy generated by ultrasonic waves are input to the welded parts by means of the upper applicator (a welding head of a welding apparatus), the lower applicator (a base of the welding apparatus) supports the welded parts, and contact surfaces of the two welded parts are connected to each other under the actions of a static pressure and high-frequency elastic vibration energy. Therefore, when the electrode assembly 30 is welded to the current collecting member 20, the welding protrusions 201 protrude from a surface of the current collecting member 20.

It can be understood that the energy storage device 1 according to this implementation may include, but is not limited to, a battery cell, a battery module, a battery pack, a battery system, etc. The energy storage device 1 may be a square battery when it is a battery cell.

First, it should be noted that the lower plastic member 11 is a component of a three-dimensional structure with a certain dimension, and thus the lower plastic member 11 has a length direction, a width direction, and a thickness direction. The length direction may be understood as an X direction in the figures, and the length direction X may also be understood as a direction from one end of the lower plastic member 11 to the other end of the lower plastic member 11. The width direction may be understood as a Y direction in the figures, and the width direction Y may also be understood as a direction perpendicular to the direction from one end of the lower plastic member 11 to the other end of the lower plastic member 11. The thickness direction may be understood as a Z direction in the figures, and the thickness direction Z may also be understood as a direction in which the top cover 13, the lower plastic member 11 and the current collecting member 20 are arranged. In addition, other components such as the current collecting member 20 also have a length direction X, a width direction Y, and a thickness direction Z. The length direction X, the width direction Y and the thickness direction Z of the other components may be understood in the same way as the length direction X, the width direction Y and the thickness direction Z of the lower plastic member 11, which will not be repeated here in this implementation.

Optionally, the energy storage device 1 may include a housing, an end cover assembly 10, a current collecting member 20, and an electrode assembly 30. The end cover assembly 10 includes an upper plastic member 11, a lower plastic member 12, a terminal 15, a top cover 13, and a response member 14. The electrode assembly 30 includes a tab and a cell 40. The end cover assembly 10 is mounted inside the housing, and the housing and the end cover assembly 10 enclose a receiving space for receiving the cell 40. For ease of understanding, the electrode assembly 30 below may also be understood as a tab, and the tab and the cell 40 will be described separately. In this implementation, the technical problems mentioned above can be solved by using the two structural members, i.e., the lower plastic member 11 and the current collecting member 20. Next, the structure of the energy storage device 1 will be described in detail.

Figure 2:
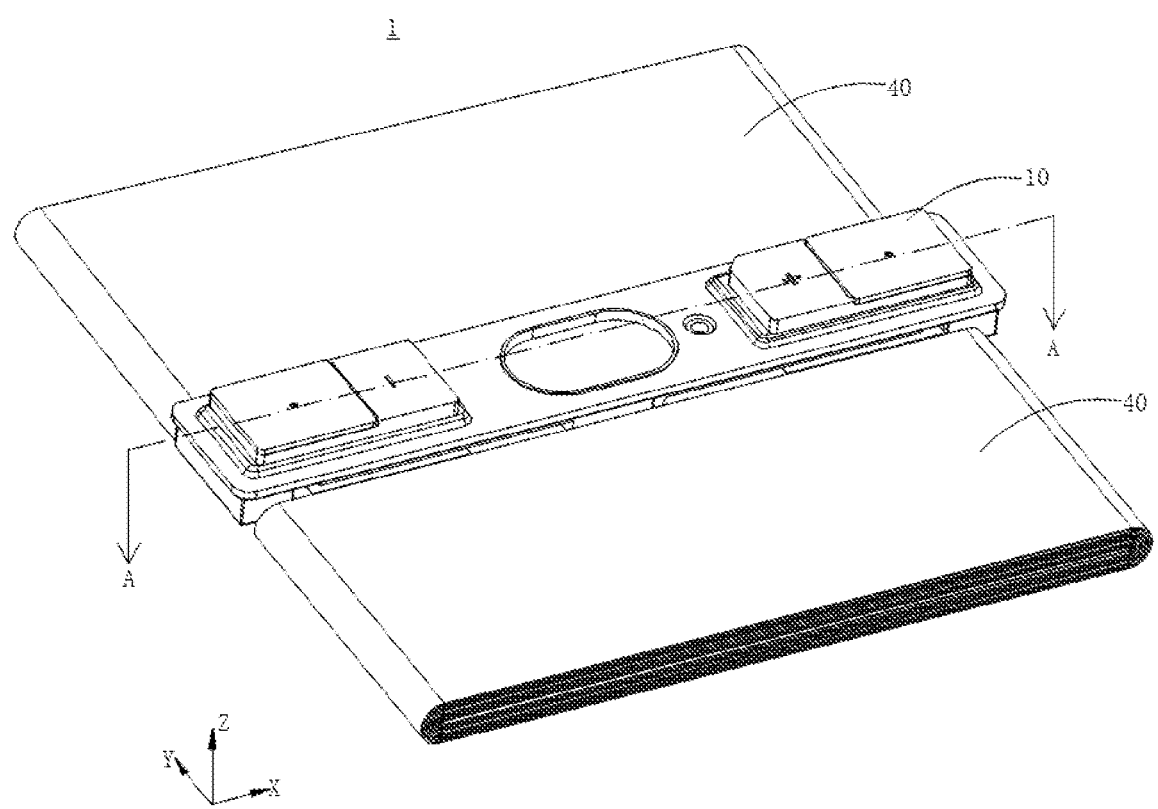
FIG. 2 is a perspective schematic structure diagram of the energy storage device shown in FIG. 1, with a housing removed and then a cell unfolded.
Figure 3:
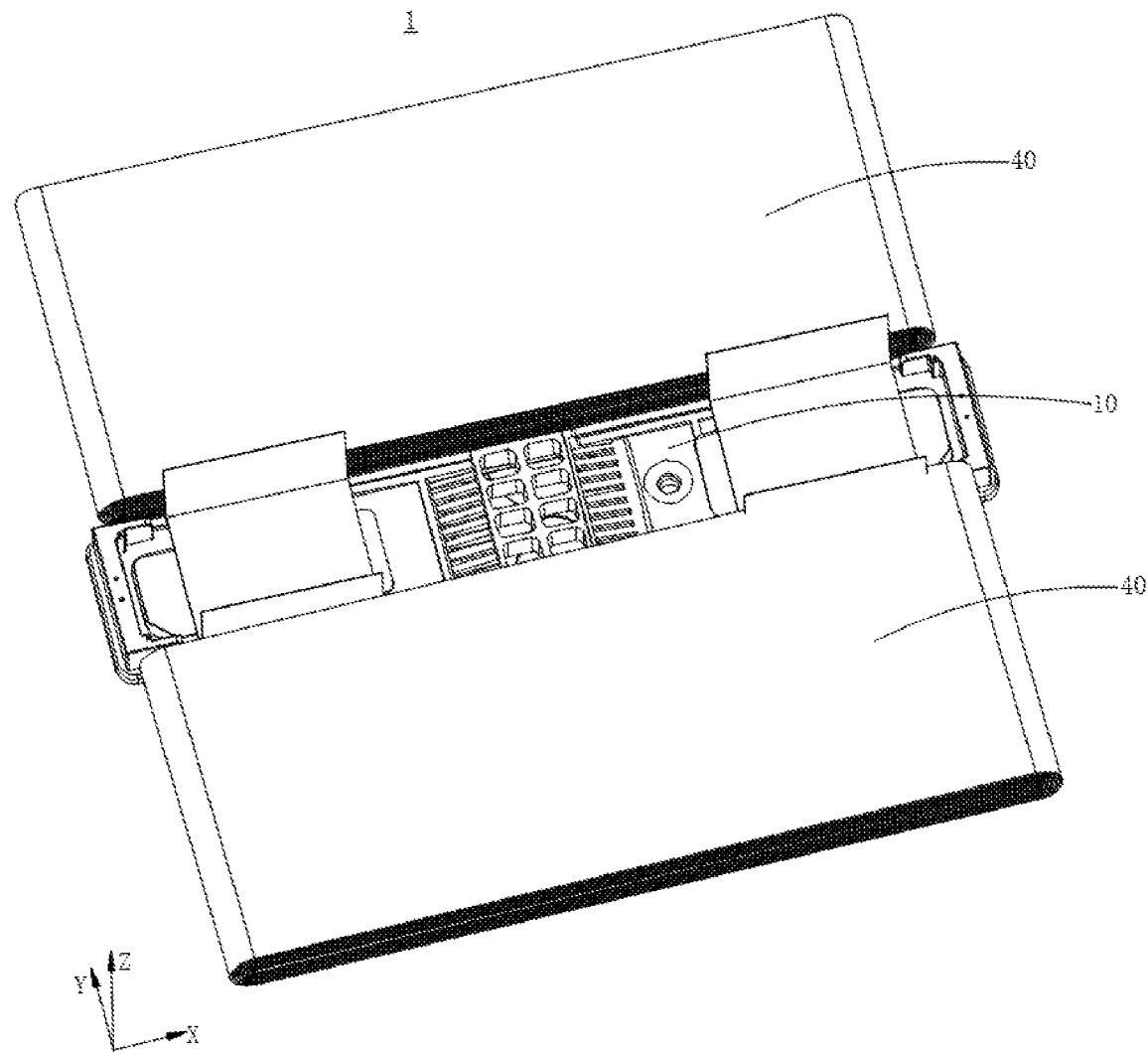
FIG. 3 is a perspective schematic structure diagram of the energy storage device shown in FIG. 2 from another perspective.

As shown in FIG. 2, the first surface 11a of the lower plastic member 11 refers to a surface of a side of the lower plastic member 11 facing upwards in the thickness direction Z. The second surface 11b of the lower plastic member 11 refers to the surface of the side the lower plastic member 11 facing downwards in the thickness direction Z.

The top cover 13 is mounted on the first surface 11a of the lower plastic member 11. In other words, the top cover 13 is arranged on one side of the lower plastic member 11, and the top cover 13 is arranged on the outer side. The response member 14 may be arranged on the top cover 13. Specifically, the top cover 13 defines an opening 131, and the response member 14 is mounted in the opening 131 and connected to the top cover 13. Moreover, the vent holes 1110 of the grid structure 111 are in communication with the opening 131, such that a gas inside the energy storage device 1 can enter the opening 131 through the vent holes 1110 and thus impact the response member 14.

In other words, the lower plastic member 11 may define a through hole 110 facing the response member 14. The vent holes 1110 of the grid structure 111 are in communication with the through hole 110, and the through hole 110 is in communication with the opening 131, so as to allow the vent holes 1110 to communicate with the opening 131, such that the gas inside the energy storage device 1 can enter the through hole 110 through the vent holes 1110 and then enter the opening 131 through the through hole 110, and thus impact the response member 14.

Optionally, the terminal 15 includes a positive terminal and a negative terminal spaced apart from each other. The energy storage device 1 further includes metallic electrically-conductive press blocks. The two metallic electrically-conductive press blocks are both arranged on a side of the response member 14 facing away from the lower plastic member 11, and the metallic electrically-conductive press blocks are arranged opposite the response member 14. One of the metallic electrically-conductive press blocks is connected to the positive terminal, and the other metallic electrically-conductive press block is connected to the negative terminal.

The electrode assembly 30 includes a positive electrode assembly and a negative electrode assembly. The positive terminal and the positive electrode assembly are both connected to one current collecting member 20, and the negative terminal and the negative electrode assembly are both connected to another current collecting member 20.

In this implementation, the response member 14 is configured to undergo stress deformation in response to an increase in a pressure inside the energy storage device 1, such that when the gas inside the energy storage device 1 exceeds a preset pressure threshold, the response member 14 can undergo stress deformation and come into contact with the metallic electrically-conductive press block. Therefore, the positive terminal connected to the metallic electrically-conductive press block is externally short-circuited with the negative terminal, and then the response member 14 and the bottom of the metallic electrically-conductive press block undergo fusing and topping due to a high short-circuit current to return to an open circuit state, thereby preventing overcharge of the energy storage device 1 and thus preventing explosion of the energy storage device 1.

When the energy storage device 1 encounters an abnormal situation, a large amount of gas will be generated inside the energy storage device 1 and impact the response member 14 through the through hole 110 in the lower plastic member 11 to turn over the response member 14 and thus allow the positive terminal to be connected to the negative terminal of the energy storage device 1 by means of the top cover 13. In other words, the positive terminal and the negative terminal are short-circuited to prevent explosion of the energy storage device 1, thereby effectively protecting the energy storage device 1. Specifically, when the positive terminal and the negative terminal are short-circuited, the current will not flow in a path from the positive terminal through the current collecting member 20 and into the cell 40. Instead, the current directly flows from the positive terminal to the negative terminal through the top cover 13, so as to prevent the current from flowing into the cell 40 and thus prevent the current from causing continued operation of the cell 40 which may aggravate the abnormality. The abnormal situation includes overcharge, over-discharge, violent collision, etc. Under the abnormal situations mentioned above, a large amount of gas will be generated inside the energy storage device 1 in a short period of time. Alternatively, when the energy storage device 1 has been used for a long time and the energy storage device 1 undergoes many charge-discharge cycles, a gas will also be generated inside the energy storage device 1 and gradually accumulated, such that a large amount of gas will be accumulated inside the energy storage device 1. In other words, the energy storage device 1 will bulge after long-term use.

In addition, the top cover 13 defines a first mounting hole 132, and the lower plastic member 11 defines a second mounting hole 114 corresponding to the first mounting hole 132. The terminal 15 runs through the first mounting hole 132 and the second mounting hole 114, so as to allow the terminal 15 to be mounted to the top cover 13 and the lower plastic member 11.

Optionally, the lower plastic member 11 may be made of a material such as plastic by means of injection molding.

In addition, the lower plastic member 11 may also be provided with a grid structure 111 that is located on a side of the through hole 110 facing away from the response member 14, and the grid structure 111 is configured to divide a part of the through hole 110 into multiple vent holes 1110. In other words, the grid structure 111 divides a part of the through hole 110 close to the current collecting member 20 into multiple vent holes 1110, and each vent hole 1110 is in communication with the through hole 110. In other words, the through hole 110 is located between the response member 14 and the grid structure 111, and the grid structure 111 is located inside the energy storage device 1. The grid structure 111 is a structure composed of multiple grids. The grid structure 111 is not a solid structure, and the multiple grids may surround spaces to define at least one vent hole 1110. Therefore, the vent holes 1110 in the grid structure 111 may be used to allow the gas to normally enter the through hole 110, and thus the function of the response member 14 will not be affected. Moreover, the multiple grids of the grid structure 111 may be further used to prevent an explosion-proof failure due to other components, such as the electrode assembly 30 or a blue film, cracking in some cases and floating to the through hole 110 below the response member 14 to block a channel through which the gas passes. Therefore, the grid structure 111 can effectively ensure normal service of the function of the response member 14.

Optionally, the grid structure 111 and the lower plastic member 11 may be of an integrated structure or separate structures. When the grid structure 111 and the lower plastic member 11 are of an integrated structure, the grid structure 111 and the lower plastic member 11 are both made of plastic. This implementation is only schematically illustrated in the case where the grid structure 111 and the lower plastic member 11 are of an integrated structure. The specific structures of the grid structure 111 and the lower plastic member 11 will be described in detail below in this implementation.

In addition, on the basis of the grid structure 111, in this implementation, the current collecting member 20 may be arranged on a side of the grid structure 111 facing away from the through hole 110. In other words, a portion of the current collecting member 20 may be located directly below the grid structure 111. In other words, the portion of the current collecting member 20 shelters the grid structure 111; and the other portion of the current collecting member 20 does not cover the grid structure 111.

The current collecting member 20 may abut against the lower plastic member 11 on a periphery of the grid structure 111, so as to allow the current collecting member 20 to be mounted to the lower plastic member 11. This is easy for mounting and removal, and since the current collecting member 20 abuts against the lower plastic member 11, the gas in the energy storage device 1 can still enter the vent holes 1110 of the grid structure 111 through a gap between the current collecting member 20 and the lower plastic member 11 and then enter the through hole 110.

Optionally, an orthographic projection of the current collecting member 20 on the top cover 13 overlaps an orthographic projection of the grid structure 111 on the top cover 13. In other words, the current collecting member 20 can cover at least a part of the grid structure 111. In other words, the current collecting member 20 is arranged directly corresponding to at least part of the multiple vent holes 1110.

In this implementation, the current collecting member 20 is arranged on a side of the grid structure 111 facing away from the response member 14, in other words, the current collecting member 20 is located directly below the grid structure 111, and the current collecting member 20 can cover at least a part of the grid structure 111. Therefore, the grid structure 111 can be blocked by the current collecting member 20, that is, a component made of plastic is blocked by a component made of metal, so as to effectively protect the grid structure 111 to prevent the grids with thin ribs in the grid structure 111 from being broken due to factors such as vibrations and bumping during transportation of the energy storage device 1, thereby improving the stability and the service life of the energy storage device 1. In addition, the arrangement of the current collecting member 20 can provide further protection for the through hole 110, that is, prevent the risk that the broken electrode assembly 30 is inserted into the current collecting member 20 and the vent holes 1110 on the periphery of the grid structure 111, enters the through hole 110 through the vent holes 1110, and is then short-circuited with the response member 14.

The current collecting member 20 mainly functions as an adapter in the energy storage device 1, that is, the terminal 15 is indirectly connected to the electrode assembly 30 by means of the current collecting member 20. For example, the positive terminal may be indirectly connected to the positive electrode assembly, and the negative terminal may also be indirectly connected to the negative electrode assembly. The current collecting member 20 is located directly below the grid structure 111, so that the grid structure 111 is blocked by the current collecting member 20, so as to effectively protect the grid structure 111 to prevent the grid structure 111 from being broken due to factors such as vibrations or bumping during transportation of the energy storage device 1, thereby improving the stability and the service life of the energy storage device 1. Moreover, the arrangement of the current collecting member 20 can provide further protection for the through hole 110, that is, prevent the risk that the broken electrode assembly 30 is inserted into the current collecting member 20 and the vent holes 1110 on the periphery of and the grid structure 111, enters the through holes 110 through the vent hole 1110, and is then short-circuited with the response member 14.

Optionally, the material of the current collecting member 20 includes, but is not limited to, metal, such as copper, aluminum, and nickel.

Optionally, the current collecting member 20 includes a first connecting portion 202 and a second connecting portion 203. The first connecting portion 202 is located on one side of the second connecting portion 203, and the second connecting portion 203 is provided with welding protrusions 201 facing the grid structure 111.

The current collecting member 20 may include two portions, that is, the first connecting portion 202 and the second connecting portion 203. The first connecting portion 202 is configured to be connected to the terminal 15. The second connecting portion 203 is configured to be connected to the electrode assembly 30. Specifically, the electrode assembly 30 may be welded to a surface of a side of the second connecting portion 203 facing away from the lower plastic member 11, so that the welding protrusions 201 may be formed on a surface of the other side of the second connecting portion 203, that is, the side of the second connecting portion 203 close to the lower plastic member 11. The welding protrusions 201 allow the electrode assembly 30 to be connected to the second connecting portion 203 more closely so as to reduce the probability of pseudo soldering. Optionally, the shapes of the welding protrusions 201 include, but are not limited to, a diamond, a triangle, a rectangle, and a circle. Optionally, the welding protrusions 201 are arranged on both the surface of the side of the current collecting member 20 close to the lower plastic member 11 and the surface of the side of the current collecting member 20 facing away from the lower plastic member 11.

The terminal 15 runs through from one side of the lower plastic member 11 to the other side of the lower plastic member 11. The entire terminal 15 located on one side of the lower plastic member 11 is exposed from the energy storage device 1, and can be connected to other external components. The terminal 15 running through the lower plastic member 11 to the other side of the lower plastic member is located inside the energy storage device 1, the surface of the side of the first connecting portion 202 close to the lower plastic member 11 may be electrically connected to the terminal 15 by means of welding, etc., and the surface of the side of the second connecting portion 203 facing away from the lower plastic member 11 may be electrically connected to one end of the electrode assembly 30 by means of welding, etc. The other end of the electrode assembly 30 may be connected to the cell 40, so that the terminal 15, the current collecting member 20, the electrode assembly 30 and the cell 40 are connected together, which facilitates subsequent current transmission.

Optionally, the current collecting member 20 further includes a fusing portion arranged between the first connecting portion 202 and the second connecting portion 203, with the width of the fusing portion being less than that of the first connecting portion 202 and that of the second connecting portion 203 in the width direction Y of the current collecting member 20.

Optionally, the current collecting member 20 further includes a transition portion arranged between the fusing portion and the second connecting portion 203, and the transition portion defines multiple transition grooves.

Optionally, the fusing portion and/or the transition portion are/is arranged on the current collecting member 20 corresponding to the positive terminal. In other words, the current collecting member 20 corresponding to the negative terminal has no fusing portion and no transition portion.

Moreover, the grid structure 111 defines an avoidance space 113, and the avoidance space 113 is used to accommodate at least part of the welding protrusions 201. Part of the welding protrusions 201 is arranged in the avoidance space 113; or all of the welding protrusions 201 are arranged in the avoidance space 113. For example, a side of the grid structure 111 close to the welding protrusions 201 has an avoidance recess; or the grid structure 111 has an avoidance hole. For example, the side of the grid structure 111 close to the welding protrusions 201 protrudes away from the welding protrusions 201. For another example, the entire grid structure 111 protrudes away from the welding protrusions.

In this implementation, the grid structure 111 defines the avoidance space 113, so that the welding protrusions 201 of the current collecting member 20 may be arranged in the avoidance space 113. In other words, the lower plastic member 11 has the avoidance space 113 to provide avoidance for the welding protrusions 201 of the current collecting member 20, so that the assembly of the lower plastic member 11 and the current collecting member 20 is more compact, that is, the lower plastic member 11 is attached to the current collecting member 20 more closely, thereby improving the assembly effect of the lower plastic member 11 and the current collecting member 20. During assembly or battery transportation, since the welding protrusions 201 may be received in the avoidance space 113, or in other words, the welding protrusions 201 are located in the avoidance space 113, the welding protrusions 201 will not directly abut against the lower plastic member 11, which can reduce the probability of the lower plastic member 11 pressing down against the welding protrusions 201 due to vibrations so as to reduce the probability of the displacement or disalignment of the current collecting member 20 and thus reduce the probability of functional failure of the current collecting member 20.

In addition, since the welding protrusions 201 are received in the avoidance space 113, it is possible to prevent the welding protrusions 201 from directly abutting against the second surface 11b of the lower plastic member 11, so that the overall thickness of the lower plastic member 11 and the current collecting member 20 can be reduced.

In conclusion, the energy storage device 1 according to this implementation can not only prevent the explosion-proof failure of the energy storage device 1, but also improve the stability and the service life of the energy storage device 1, and allow the assembly of the lower plastic member 11 and the current collecting member 20 to be more compact, so as to reduce the risk of displacement or disalignment of the current collecting member 20 and thus reduce the risk of failure of the current collecting member 20. In addition, the energy storage device 1 according to this implementation may further reduce the overall thickness of the lower plastic member 11 and the current collecting member 20.

Referring to FIGS. 5 to 10, optionally, in this implementation, the surface of the side of the grid structure 111 close to the current collecting member 20 is bent and dented away from the current collecting member 20 to define the avoidance space 113.

In an implementation, the grids of the grid structure 111 may be bent away from the current collecting member 20, so that the grids are bent and dented away from the current collecting member 20 as a whole to define the avoidance space 113 mentioned above, so that the difficulty of manufacturing the grid structure 111 can be reduced. Since the surface of the other side of the grid corresponds to the through hole 110, the normal use of the response member 14 will not be affected when the surface of the other side of the grid protrudes or even enters the through hole 110.

In another implementation, the surface of the side of the grid close to the current collecting member 20 in the grid structure 111 can be bent and dented, so that the surface of the side of the grid close to the current collecting member 20 is bent and dented away from the current collecting member 20 to define the avoidance space 113. For example, the surface of the side of the grid close to the current collecting member 20 is slotted to define the avoidance space 113 mentioned above.

Figure 6:
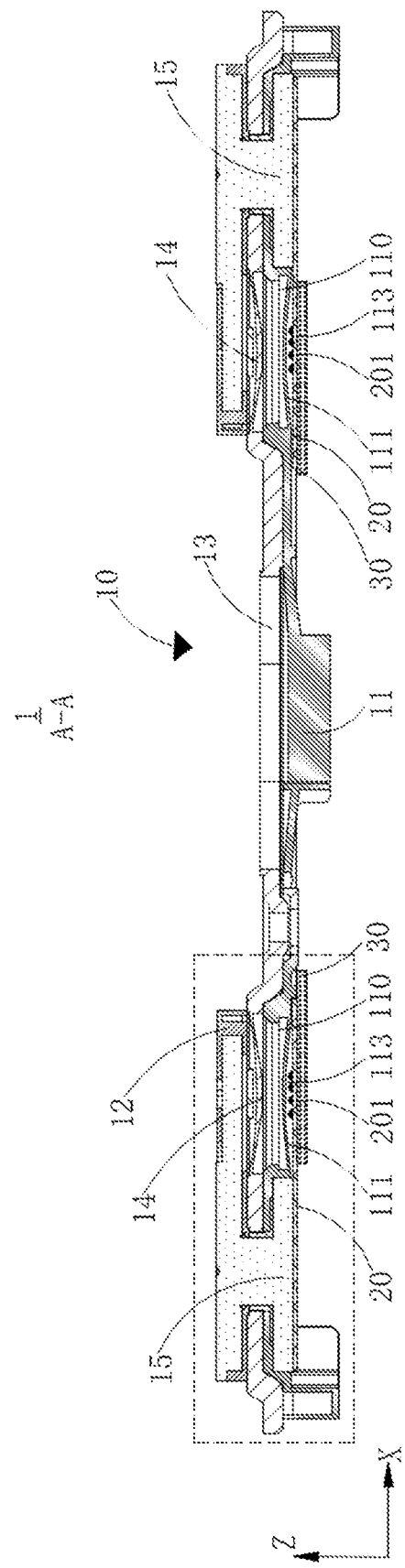
FIG. 6 is a schematic cross-sectional diagram of the energy storage device shown in FIG. 2 along line A-A, with the cell removed.
Figure 7:
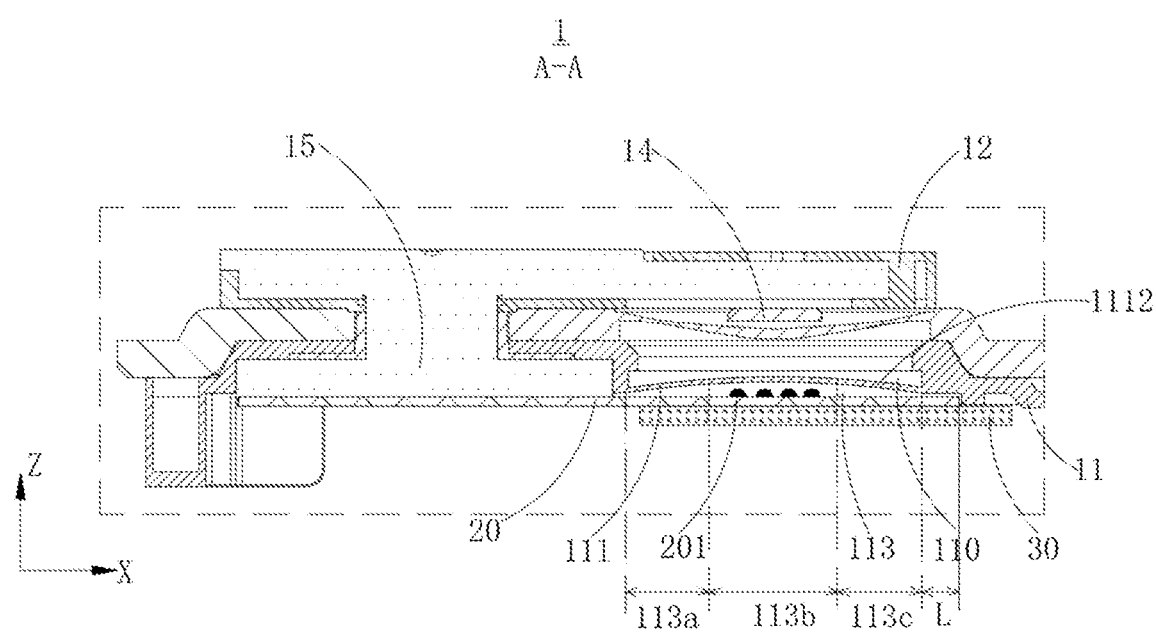
FIG. 7 is a partial schematic diagram in FIG. 6.

Referring to FIGS. 6 and 7, in this implementation, the avoidance space 113 has a first portion 113a, a second portion 113b, and a third portion 113c. The second portion 113b is connected between the first portion 113a and the third portion 113c, a dented depth of the first portion 113a and a dented depth of the third portion 113c are both less than a dented depth of the second portion 113b, and at least part of the welding protrusions 201 faces the second portion 113b in the thickness direction Z of the energy storage device 1.

The avoidance space 113 may include three regions, that is, a first portion 113a, a second portion 113b, and a third portion 113c. The second portion 113b is arranged between the first portion 113a and the third portion 113c, so that the second portion 113b may also be understood as a central region of the avoidance space 113, and the first portion 113a and the third portion 113c may be understood as peripheral regions of the avoidance space 113. Moreover, the dented depth of the first portion 113a and the dented depth of the third portion 113c are both less than that of the second portion 113b. In other words, the dented depth of the central region of the avoidance space 113 is greater than those of the peripheral regions of the avoidance space 113, that is, the avoidance space 113 is a depression that is shallow at its edge and deep in the middle. Optionally, the first portion 113a and the third portion 113c are arranged symmetrically. The dented depth of the first portion 113a is equal to that of the third portion 113c.

At least part of the welding protrusions 201 faces the second portion 113b in the thickness direction Z of the energy storage device 1, and it can also be understood that the welding protrusions 201 are arranged directly corresponding to the second portion 113b. The welding protrusions 201 are arranged in the second portion 113b with a greater dented depth, so as to provide more avoidance space 113 for the welding protrusions 201 to reduce the probability of the welding protrusions 201 coming into contact with the lower plastic member 11, so that the assembly of the lower plastic member 11 and the current collecting member 20 is more compact. Optionally, a height of each of the welding protrusions 201 is less than the dented depth of the second portion 113b and greater than the dented depth of the first portion 113a and the dented depth of the third portion 113c. In this implementation, since the height of the welding protrusions 201 is greater than the dented depth of the first portion 113a and the dented depth of the third portion 113c, the grids of the first portion 113a and the third portion 113c can limit the position of the welding protrusions 201 of the current collecting member 20 on the lower plastic member 11, and also reduce the probability of the lower plastic member 11 pressing down against the welding protrusions 201 due to vibrations, so as to reduce the probability of displacement or disalignment of the current collecting member 20 and thus reduce the probability of functional failure of the current collecting member 20. In addition, the grids of the first portion 113a and the third portion 113c can fit with the grids of the second portion 113b, so as to provide a positioning function during assembly of the lower plastic member 11 and the current collecting member 20, thereby reducing the assembly difficulty.

Optionally, the welding protrusions 201 are divided into a fourth part, a fifth part, and a sixth part. The fifth part is arranged between the fourth part and the sixth part, and the height of each welding protrusion in the fourth part and the height of each welding protrusion in the sixth part are both less than that of each welding protrusion in the fifth part. The welding protrusions 201 of the fourth part face the avoidance space 113 of the first portion 113a, the welding protrusions 201 of the fifth part face the avoidance space 113 of the second portion 113b, and the welding protrusions 201 of the sixth part face the avoidance space 113 of the third portion 113c.

Figure 9:
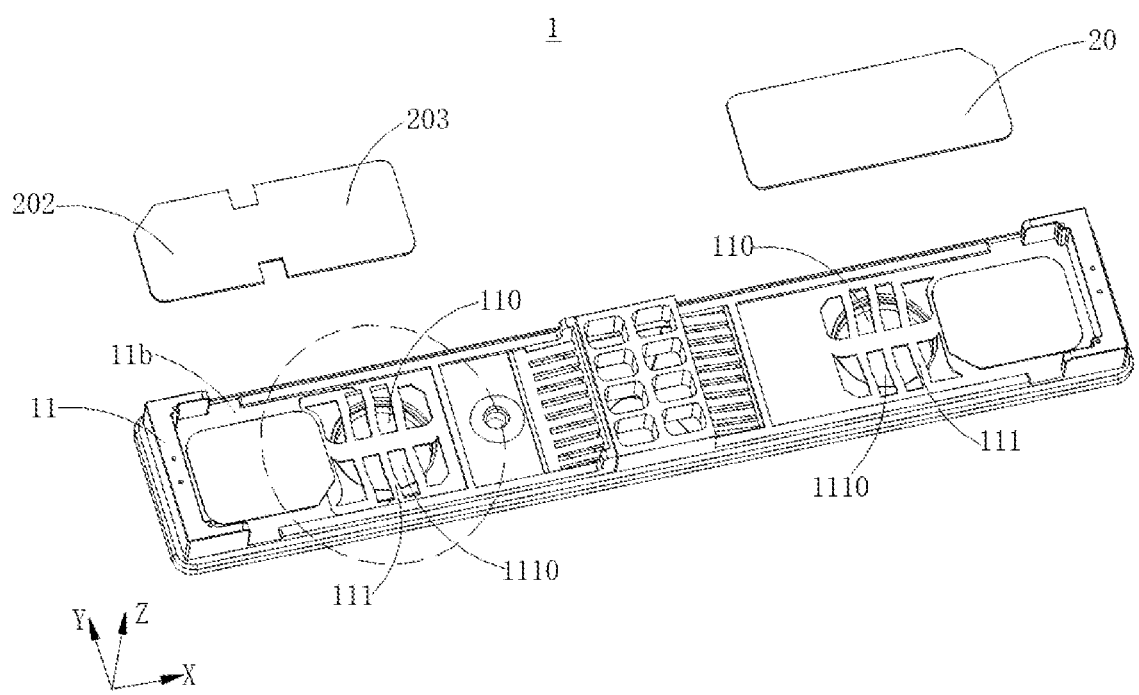
FIG. 9 is an exploded view of the lower plastic member and the current collecting member shown in FIG. 8.
Figure 10:
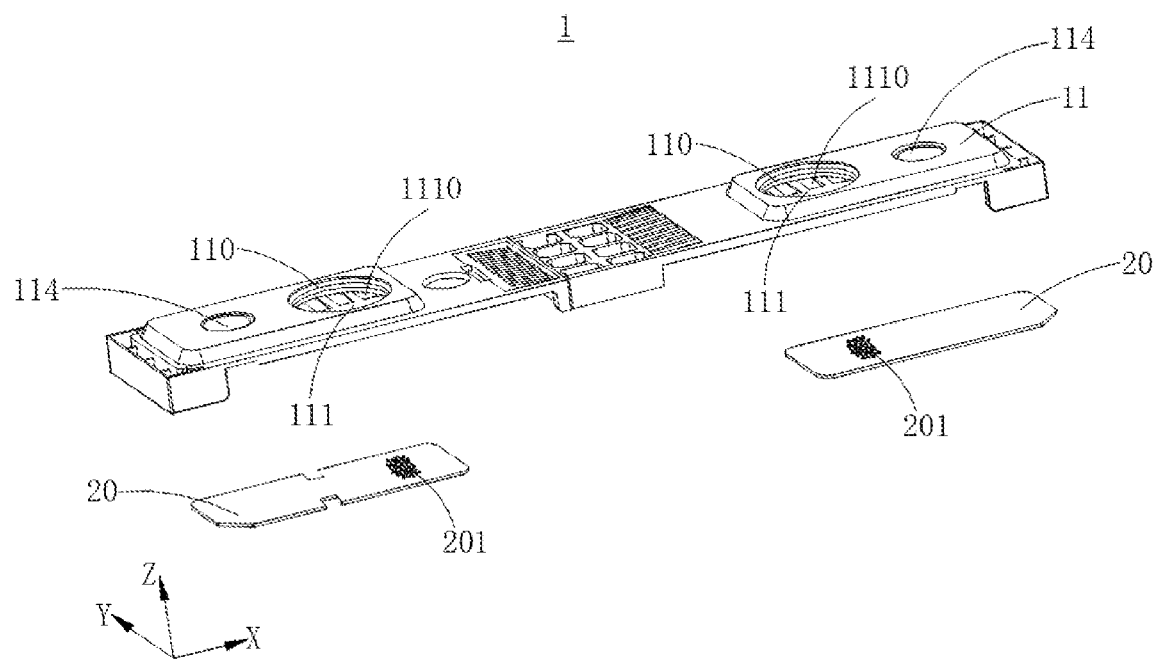
FIG. 10 is an exploded view of the lower plastic member and the current collecting member shown in FIG. 8 from another perspective.
Figure 11:
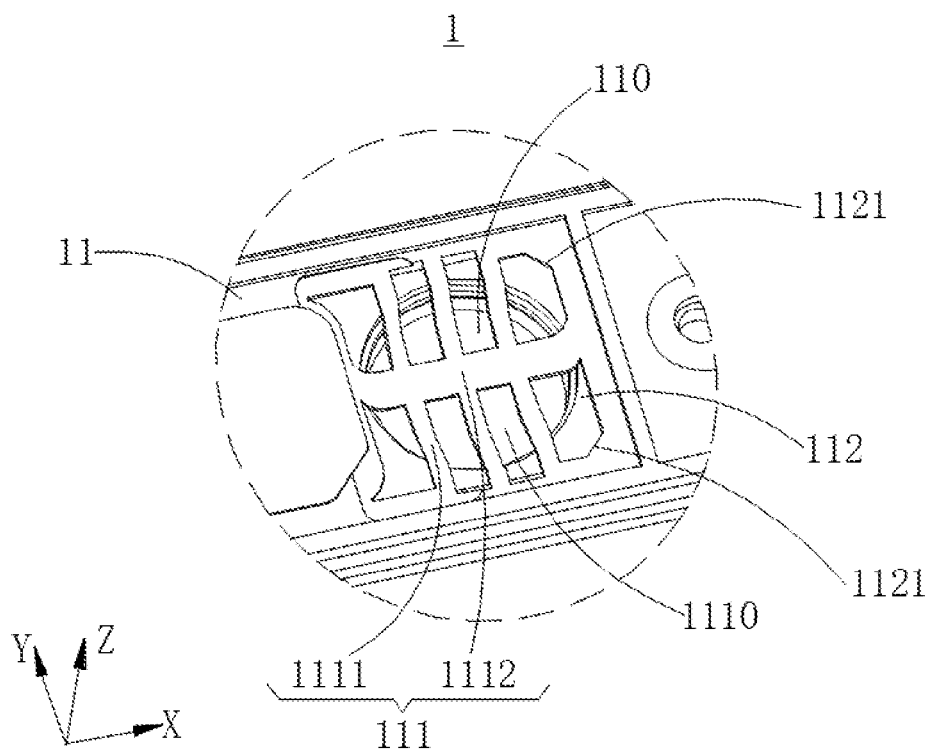
FIG. 11 is a partial schematic diagram in FIG. 9.

Referring to FIGS. 9 and 11, in this implementation, the grid structure 111 includes multiple first grids 1111 arranged at intervals in a length direction of the lower plastic member 11; every adjacent two of the first grids 1111 surround a space to define a vent hole 1110; and at least part of each of the first grids 1111 is bent away from the current collecting member 20 to define the avoidance space 113.

The grid structure 111 may include multiple first grids 1111 configured to surround spaces to define multiple vent holes 1110. The first grids 1111 and the lower plastic member 11 form an integrally formed structural member. There are 2-6 first grids 1111. Every two adjacent first grids 1111 are equally spaced. For example, the grid structure 111 includes three first grids 1111 arranged at intervals in the length direction X of the current collecting member 20, and the two adjacent first grids 1111 may surround spaces to two vent holes 1110. The first grids 1111 together with a partial structure of the lower plastic member 11 may also define two further vent holes 1110. Optionally, two vent holes 1110 of the four vent holes 1110 in the middle protrude from the current collecting member 20. Further, optionally, all the four vent holes 1110 protrude from the current collecting member 20.

At least part of each of the first grids 1111 is at least partially bent away from the current collecting member 20 to define the avoidance space 113. Optionally, in an implementation, a part of each of the first grids 1111 is bent away from the current collecting member 20 to define the avoidance space 113. In another implementation, middle portions of the first grids 1111 are bent away from the current collecting member 20 to define the avoidance space 113. In yet another implementation, the entireties of the first grids 1111 are bent away from the current collecting member 20 to define the avoidance space 113.

In this implementation, by means of arranging the multiple first grids 1111 and allowing at least part of each of the first grids 1111 to be bent, the lower plastic member 11 has the avoidance space 113 to provide avoidance for the welding protrusions 201 of the current collecting member 20. In this way, the grid structure 111 defines the avoidance space 113 to allow the welding protrusions 201 to be arranged in the avoidance space 113, so that the lower plastic member 11 is attached to the current collecting member 20 more closely, and the overall thickness is reduced; and the grid structure 111 has multiple vent holes 1110 to allow gas to normally enter the through hole 110, and the multiple first grids 1111 may also be used to prevent the explosion-proof failure due to other components, such as the electrode assembly 30 or the blue film, cracking in some cases and floating to the through hole 110 below the response member 14 to block the channel through which the gas passes.

Referring to FIGS. 8, 9, 11 and 12, in this implementation, the first grid 1111 includes a bent portion 1111a and supporting portions 1111b arranged on two opposite sides of the bent portion 1111a, and the bent portion 1111a is bent away from the current collecting member 20 to form the avoidance space 113.

The first grid 1111 may include a supporting portion 1111b and a bent portion 1111a. The supporting portion 1111b is configured to support the bent portion 1111a and/or the current collecting member 20, and the bent portion 1111a is configured to form the avoidance space 113. The surface of the side of the supporting portion 1111b close to the current collecting member 20 is arranged horizontally to the surface of the side of the lower plastic member 11 close to the current collecting member 20. Optionally, the supporting portion 1111b and the bent portion 1111a form an integrally formed structural member. The supporting portion 1111b, the bent portion 1111a and the lower plastic member 11 form an integrally formed structural member.

In this implementation, the supporting portion 1111b and the bent portion 1111a are provided and fit with each other, so that the bent portion 1111a can form the avoidance space 113, and the welding protrusions 201 can be arranged in the avoidance space 113, so that the lower plastic member 11 is attached to the current collecting member 20 more closely, so as to reduce the risk of displacement or disalignment of the current collecting member 20 and thus reduce the risk of failure of the current collecting member 20. In addition, in the energy storage device 1 of this implementation, the overall thickness of the lower plastic member 11 and the current collecting member 20 may also be reduced. In this implementation, the supporting portion 1111b can support the bent portion 1111a and/or the current collecting member 20, so as to improve the supporting capacity of the grid structure 111, thereby improving the stability of the energy storage device 1.

Figure 12:
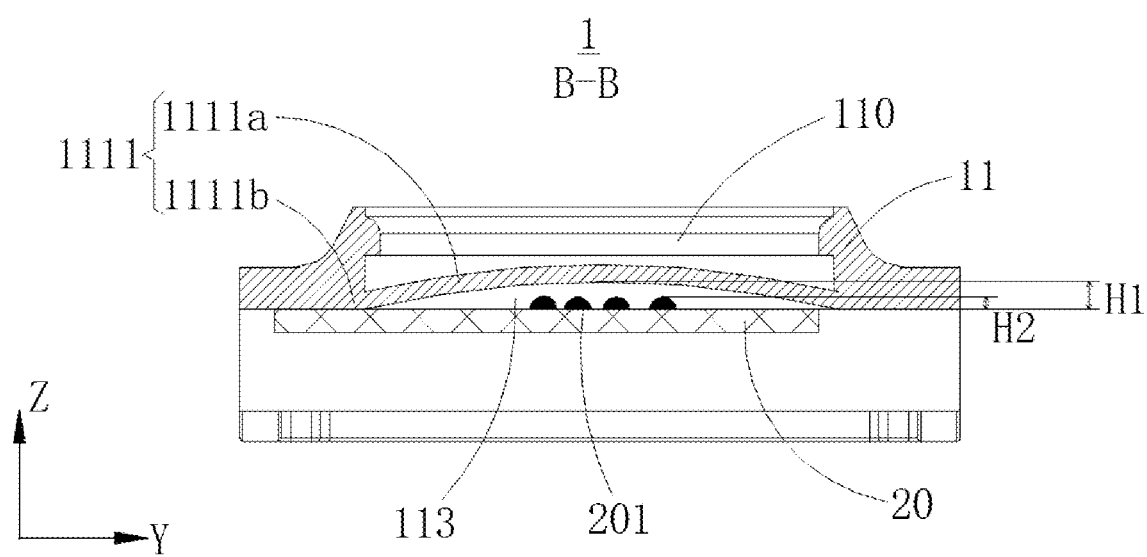
FIG. 12 is a schematic cross-sectional diagram of the lower plastic member and the current collecting member shown in FIG. 8 along line B-B.

Referring to FIGS. 11 and 12, in this implementation, the second surface 11b of the lower plastic member 11 defines a recess 112, the grid structure 111 is arranged in the recess 112, the first surface 11a of the lower plastic member 11 defines a through hole 110, the through hole 110 runs through the second surface 11b of the lower plastic member 11 and a bottom wall of the recess 112, the first grids 1111 may also enclose the vent holes 1110 with a side wall of the recess 112, the supporting portion 1111b is arranged opposite the bottom wall of the recess 112, and the bent portion 1111a is arranged opposite the through hole 110.

The lower plastic member 11 may define a recess 112, the grid structure 111 is arranged in the recess 112, and the through hole 110 runs through a bottom wall of the recess 112, so that the through hole 110 can be in communication with the grid structure 111, and the overall thickness of the lower plastic member 11 can also be reduced.

The first grids 1111 may also enclose vent holes 1110 with a side wall of the recess 112, and the first grids 1111 are arranged on the side wall of the recess 112. Optionally, in an implementation, the first grid 1111 is arranged on the side wall of the recess 112, and there is a gap between the first grid 1111 and the bottom wall of the recess 112. In another implementation, the first grid 1111 may be arranged on both the bottom wall and the side wall of the recess 112. This implementation is only schematically illustrated in the case where the first grid 1111 is arranged on both the bottom wall and the side wall of the recess 112.

Optionally, in an implementation, the supporting portion 1111b is arranged on the side wall of the recess 112, and there is a gap between the supporting portion 1111b and the bottom wall of the recess 112. In another implementation, the supporting portion 1111b is arranged on both the bottom wall and the side wall of the recess 112. Optionally, the bent portion 1111a is at least partially arranged in the through hole 110.

The supporting portion 1111b is arranged opposite the bottom wall of the recess 112, which may also be understood as that the supporting portion 1111b is arranged directly corresponding to the bottom wall of the recess 112. In other words, the orthographic projection of the supporting portion 1111b on the side of the lower plastic member 11 close to the current collecting member 20 is located in the bottom wall of the recess 112. In other words, the supporting portion 1111b is arranged on the bottom wall and/or the side wall of the recess 112. This arrangement can allow the first grid 1111 to be attached to the recess 112 of the lower plastic member 11 more closely, and enhance the overall strength of the grid structure 111, thereby improving the overall stability of the grid structure 111. In addition, the bent portion 1111a is arranged opposite the through hole 110, which may also be understood as that the bent portion 1111a is arranged directly corresponding to the through hole 110. This arrangement may provide more space that the bent portion 1111a is dented away from the current collecting member 20, that is, provide a larger avoidance space 113.

Optionally, in an implementation, the grid structure 111 may be arranged on the bottom wall of the recess 112. In another implementation, the grid structure 111 may be arranged on the side wall of the recess 112. In yet another implementation, the grid structure 111 may be arranged on both the bottom wall and the side wall of the recess 112.

Referring to FIG. 11, in this implementation, the top cover 13 defines a first mounting hole 132, the lower plastic member 11 defines a second mounting hole 114 arranged opposite the first mounting hole 132, the second mounting hole 114 runs through the first surface 11a and the second surface 11b, the terminal 15 runs through the first mounting hole 132 and the second mounting hole 114, the side wall of the recess 112 away from the second mounting hole 114 has two chamfers 1121 arranged opposite each other in the width direction Y of the lower plastic member 11, and the end of the second connecting portion 203 away from the first connecting portion 202 is arranged opposite the two chamfers 1121.

The end of the second connecting portion 203 away from the first connecting portion 202 is arranged opposite the two chamfers 1121, in other words, the second connecting portion 203 abuts against the chamfers 1121 of the side wall of the recess 112, or the second connecting portion 203 is clamped at the chamfers 1121 of the side wall of the recess 112. In this implementation, the side wall of the recess 112 away from the second mounting hole 114 is provided with the two chamfers 1121, and the two chamfers 1121 are configured to correspond to the end of the second connecting portion 203 away from the first connecting portion 202, so that the current collecting member 20 can be reliably lapped on the side wall of the recess 112, and thus the current collecting member 20 does not need to be lapped on the second surface 11b outside the recess 112 of the lower plastic member 11 away from the second mounting hole 114, so that the length of the current collecting member 20 is effectively limited to avoid waste of materials in the case that the current collecting member 20 is too long. Moreover, the position of the current collecting member 20 can be further limited by clamping the current collecting member 20 by means of the chamfers 1121, so as to prevent the grid structure 111 from being damaged by vibration when the welding protrusions 201 come into direct contact with the grid structure 111.

Figure 8:
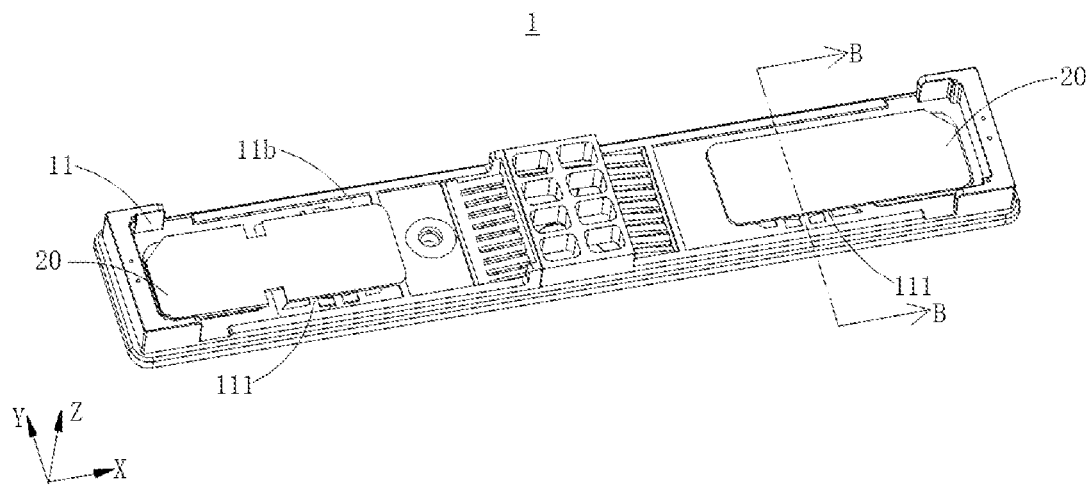
FIG. 8 is a schematic diagram of a lower plastic member fitting with a current collecting member according to an implementation of the disclosure.

Referring to FIGS. 8 and 12, in this implementation, the supporting portion 1111b at least partially abuts against the second connecting portion 203 of the current collecting member 20.

Optionally, in an implementation, a portion of the supporting portion 1111b may abut against the second connecting portion 203 of the current collecting member 20. In another implementation, the whole supporting portion 1111b may abut against the second connecting portion 203 of the current collecting member 20. This implementation is only schematically illustrated in the case where a portion of the supporting portion 1111b abuts against the second connecting portion 203 of the current collecting member 20.

In this implementation, the second connecting portion 203 of the current collecting member 20 may abut against at least a part of the supporting portion 1111b, so that the bent portion 1111a is located directly above the current collecting member 20. This can effectively protect the bent portion 1111a of the grid structure 111 to prevent the avoidance space 113 from being destroyed during transportation of the energy storage device 1 caused by the grid structure 111 being broken due to factors such as vibration or bumping or caused by the deformation of the bent portion 1111a, thereby improving the stability and prolonging the service life of the energy storage device 1.

Referring to FIG. 11, in this implementation, the grid structure 111 further includes a second grid 1112 extending in the same direction as the length direction X of the lower plastic member 11, the second grid 1112 is connected to the multiple first grids 1111, the two opposite ends of the second grid 1112 are both connected to the side wall of the recess 112, and the second grid 1112 is entirely bent away from the current collecting member 20 to form the avoidance space 113.

Figure 4:
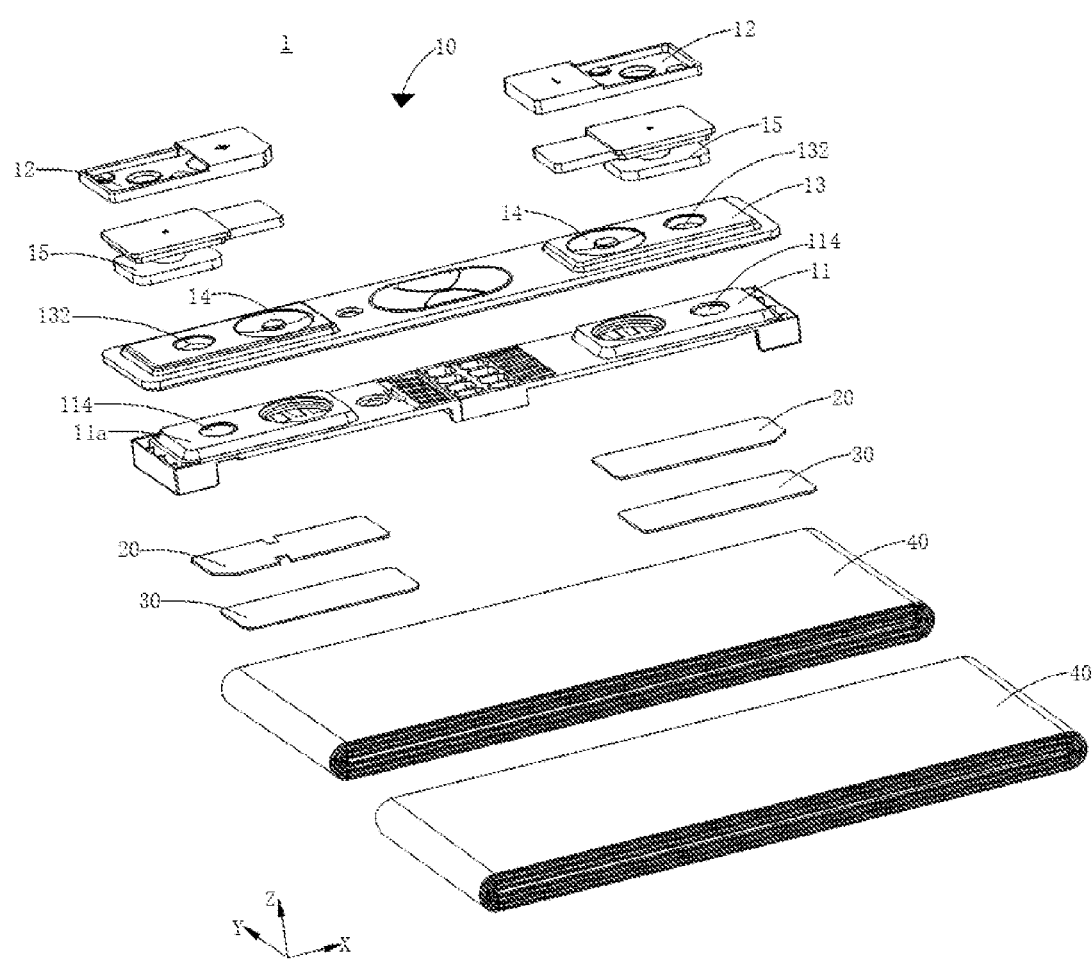
FIG. 4 is an exploded view of a partial structure of the energy storage device shown in FIG. 2.
Figure 5:
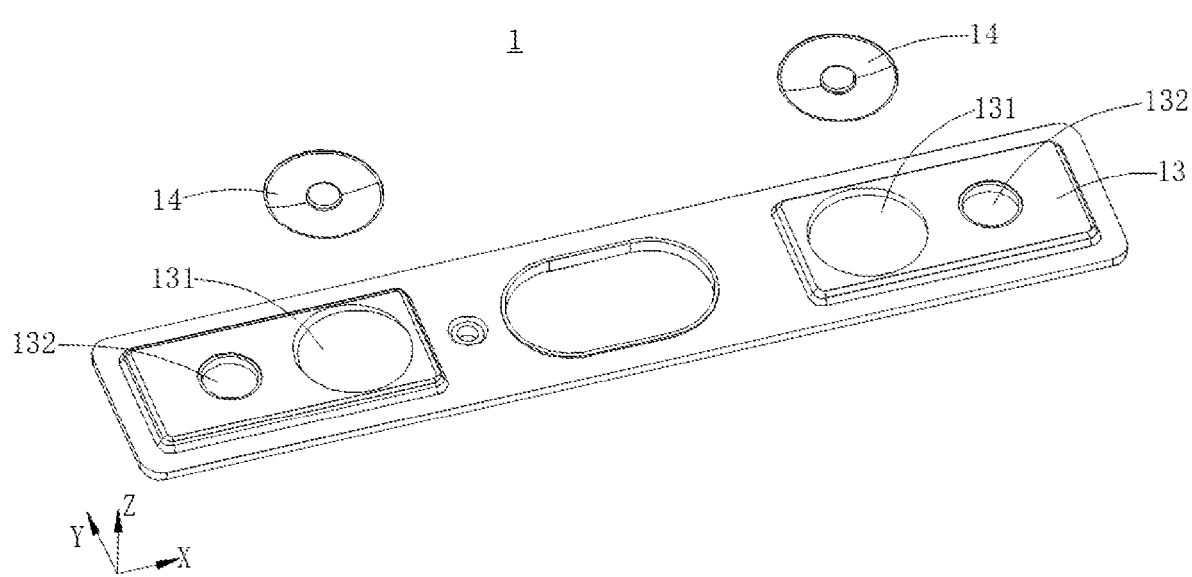
FIG. 5 is an exploded view of structures of a top cover and a response member shown in FIG. 2.

Referring to FIGS. 4, 7 and 9, in this implementation, the top cover 13 defines a first mounting hole 132, the lower plastic member 11 defines a second mounting hole 114 corresponding to the first mounting hole 132, the second mounting hole 114 extends through the first surface 11a and the second surface 11b, the terminal 15 extends through the first mounting hole 132 and the second mounting hole 114, and in the length direction X of the lower plastic member 11, the one end of the second connecting portion 203 away from the first connecting portion 202 goes beyond one end of the second grid 1112 away from the second mounting hole 114.

The end of the second connecting portion 203 away from the first connecting portion 202 abuts against the second surface 11b of the lower plastic member 11 on the side of the second grid 1112 away from the second mounting hole 114. In other words, the end of the second connecting portion 203 away from the first connecting portion 202 goes beyond the end of the second grid 1112 away from the second mounting hole 114. It can also be understood that the rightmost end of the current collecting member 20 can be reliably lapped on the rightmost second surface 11b of the second grid 1112.

In this implementation, limiting the position of the end of the second connecting portion 203 away from the first connecting portion 202 can ensure that the second connecting portion 203 of the current collecting member 20 can be reliably lapped on the second surface 11b of the lower plastic member 11 on the side of the second grid 1112 away from the second mounting hole 114. Moreover, since the current collecting member 20 is relatively protruding, or in other words, the current collecting member 20 is relatively long, it is also possible to provide a certain error tolerance for a position where the current collecting member 20 is welded to the terminal 15 (that is, the lapping at the rightmost end can be achieved in case of welding a little to the left or to the right), in other words, it is also possible to provide a certain error tolerance for the first connecting portion 202.

Referring to FIGS. 4, 7, and 9, in this implementation, the end of the second connecting portion 203 away from the first connecting portion 202 goes beyond the end of the second grid 1112 away from the second mounting hole 114 by a distance of 1 mm to 12 mm.

In this implementation, the end of the second connecting portion 203 away from the first connecting portion 202 goes beyond the end of the second grid 1112 away from the second mounting hole 114 by a distance (shown as L in FIG. 7) of 1 mm to 12 mm. This can ensure that the second connecting portion 203 of the current collecting member 20 can be reliably lapped on the second surface 11b of the second grid 1112 on the side away from the second mounting hole 114 in the lower plastic member 11, and can also provide a certain error tolerance for the position where the current collecting member 20 is welded to the terminal 15 (that is, the lapping at the rightmost end can be achieved in case of welding a little to the left or to the right), in other words, it is also possible to provide a certain error tolerance for the first connecting portion 202.

Optionally, the end of the second connecting portion 203 away from the first connecting portion 202 goes beyond the end of the second grid 1112 away from the second mounting hole 114 by a distance of 1 mm, 2 mm, 3 mm, 4 mm, 5 mm, 6 mm, 7 mm, 8 mm, 9 mm, 10 mm, 11 mm, 12 mm, etc.

The grid structure 111 may further include a second grid 1112. Optionally, the second grid 1112 extends in the same direction as the length direction X of the lower plastic member 11. The second grid 1112 is arranged perpendicular to the first grids 1111. The first grids 1111 and the second grid 1112 form an integrally formed structural member. The first grids 1111, the second grid 1112 and the lower plastic member 11 form an integrally formed structural member. The second grid 1112 has a width greater than that of the first grids 1111. The second grid 1112, the first grids 1111, and a side wall of the recess 112 surround spaces to define multiple vent holes 1110. In the width direction Y of the current collecting member 20, the second grid 1112 has the same distance from side walls of two opposite sides of the recess 112.

In this implementation, the second grid 1112 has two ends respectively connected to the side walls of the recess 112, and the second grid 1112 extends through the first grids 1111, so that the grid structure 111 is fixed and has an enhanced overall strength so as to prevent the grid structure 111 from being broken due to factors such as vibrations or bumping during transportation of the energy storage device 1, thereby improving the stability and the service life of the energy storage device 1.

Referring to FIGS. 8 and 12, in this implementation, the supporting portion 1111b is flush with a surface of the lower plastic member 11 that defines the recess 112. This can improve the flatness of the surface of the lower plastic member 11 and reduce the difficulty of machining and molding. Moreover, the assembly of the current collecting member 20 with the grid structure 111 and the lower plastic member 11 is more compact, that is, the supporting portion 1111b is flush with the surface of the lower plastic member 11 that defines the recess 112, so that both the supporting portion 1111b and the surface of the lower plastic member 11 that defines the recess 112 can abut against the current collecting member 20. In other words, the current collecting member 20 can not only abut against the surface of the lower plastic member 11 that defines the recess 112, but also abut against the supporting portion 1111b of the grid structure 111, so that the assembly of the lower plastic member 11 and the current collecting member 20 is more compact, so as to reduce the probability of displacement or disalignment of the current collecting member 20 and thus reduce the probability of functional failure of the current collecting member 20.

Referring to FIG. 12, in this implementation, a ratio of a height of the welding protrusions 201 to the maximum dented depth of the grid structure 111 is 0.15-0.95.

The height of the welding protrusions 201 refers to the dimension of the welding protrusions 201 in the thickness direction Z of the current collecting member 20, and may also be understood as the thickness of the welding protrusions 201 (shown as H2 in FIG. 12). The dented depth of the grid structure 111 refers to the maximum dented depth of the grid structure 111 in the thickness direction Z of the current collecting member 20 (shown as H1 in FIG. 12).

In this implementation, the ratio of the height of the welding protrusions 201 to the maximum dented depth of the grid structure 111 is defined to ensure that the welding protrusions 201 have a distance from the grid structure 111 when the welding protrusions 201 are arranged in the avoidance space 113 of the grid structure 111, so that a sufficient avoidance space 113 is reserved for the welding protrusions 201 to reduce the probability of the lower plastic member 11 pressing down against the welding protrusions 201 due to vibrations, so as to reduce the probability of displacement or disalignment of the current collecting member 20 and thus reduce the probability of functional failure of the current collecting member 20, thereby prolonging the service life of the energy storage device 1.

Optionally, the ratio of the height of the welding protrusions 201 to the maximum dented depth of the grid structure 111 may be 0.15, 0.2, 0.25, 0.3, 0.35, 0.4, 0.45, 0.5, 0.55, 0.6, 0.65, 0.7, 0.75, 0.8, 0.85, 0.9, 0.95, etc.

Referring to FIG. 12, in this implementation, the maximum dented depth of the grid structure 111 is 0.05 mm to 1.8 mm.

The dented depth of the grid structure 111 refers to the maximum dented depth of the grid structure 111 in the thickness direction Z of the current collecting member 20 (shown as H1 in FIG. 12).

In this implementation, the maximum dented depth of the grid structure 111 is defined to ensure that the grid structure 111 has a sufficient dented depth, so that the welding protrusions 201 have a distance from the grid structure 111 when the welding protrusions 201 are arranged in the avoidance space 113 of the grid structure 111, so that a sufficient avoidance space 113 is reserved for the welding protrusions 201 to reduce the probability of the lower plastic member 11 pressing down against the welding protrusions 201 due to vibrations, so as to reduce the probability of displacement or disalignment of the current collecting member 20 and thus reduce the probability of functional failure of the current collecting member 20, thereby prolonging the service life of the energy storage device 1.

Optionally, the maximum dented depth of the grid structure 111 may be 0.05 mm, 0.25 mm, 0.45 mm, 0.65 mm, 0.85 mm, 1.05 mm, 1.25 mm, 1.45 mm, 1.65 mm, 1.75 mm, 1.8 mm, etc.

This implementation further provides a power consuming apparatus, including an energy storage device according to the above implementation of the disclosure, the energy storage device supplying power to the power consuming apparatus.

The power consuming apparatus according to this implementation may be applied in the fields of vehicles, power storage stations, etc. Optionally, the illustration is made taking an example in which the power consuming apparatus is a vehicle that may be a fuel vehicle, a gas vehicle or a new energy vehicle. The new energy vehicle may be a battery electric vehicle, a hybrid electric vehicle, an extended-range vehicle, etc. The vehicle includes a battery, a controller, and a motor. The battery is configured to supply power to the controller and the motor as a power source for operating and driving the vehicle. For example, the battery is configured to meet the operation power demands during starting, navigation, and traveling of the vehicle. For example, the battery supplies power to the controller, the controller controls the battery to supply power to the motor, and the motor receives and uses the power from the battery as a power supply for driving the vehicle, replacing or partially replacing fuel or natural gas to provide driving power for the vehicle.

In the power consuming apparatus according to this implementation, the energy storage device according to the above implementation of the disclosure is used. Firstly, since in the energy storage device, the vent holes are in communication with the opening by means of the grid structure to allow the vent holes to be in communication with the response member, the vent holes in the grid structure can be used to allow a gas to pass through, so that the response member can be turned over away from the lower plastic member when the predetermined pressure is exceeded. Multiple grids in the grid structure may be further used to prevent the explosion-proof failure due to other components, such as the electrode assembly or the blue film, cracking in some cases and floating to below the response member to block the channel through which the gas passes.

Secondly, the grid structure defines the avoidance space, so that the welding protrusions of the current collecting member may be arranged in the avoidance space. In other words, the lower plastic member has the avoidance space to provide avoidance and receive the welding protrusions of the current collecting member, so that the assembly of the lower plastic member and the current collecting member is more compact, that is, the lower plastic member is attached to the current collecting member more closely, thereby improving the assembly effect of the lower plastic member and the current collecting member. During assembly or battery transportation, since the welding protrusions may be received in the avoidance space, it is possible to reduce the probability of the lower plastic member pressing down against the welding protrusions due to vibration, so as to reduce the probability of displacement or disalignment of the current collecting member and thus reduce the probability of functional failure of the current collecting member.

In addition, since the welding protrusions are received in the avoidance space, the welding protrusions are prevented from directly abutting against the second surface of the lower plastic member, so that the overall thickness of the lower plastic member and the current collecting member can be reduced.

In conclusion, in the power consuming apparatus according to this implementation, using the above energy storage device, the explosion-proof failure of the energy storage device can be prevented, and the assembly of the lower plastic member and the current collecting member can be more compact, so as to reduce the risk of displacement or disalignment of the current collecting member and thus reduce the risk of failure of the current collecting member. In addition, according to the energy storage device of the disclosure, the overall thickness of the lower plastic member and the current collecting member can also be reduced.

The "example" or "implementation" mentioned herein means that a particular feature, structure, or characteristic described with reference to the implementation or implementation may be included in at least one implementation of the disclosure. This term appearing in various parts of the specification not necessarily refers to the same implementation, or an independent or alternative implementation that is exclusive to other implementations. Those skilled in the art understand explicitly or implicitly that the implementation described herein may be combined with another implementation.

It should be noted that the terms "first", "second", and the like in the specification, the claims, and the accompanying drawings of the disclosure are used to distinguish different objects, rather than to describe a particular order. In addition, the terms "include" and "have" and any variations thereof are intended to cover a non-exclusive inclusion.

In this specification, for the sake of convenience, the expressions indicating an orientation or positional relationship such as "middle", "upper", "lower", "front", "rear", "vertical", "horizontal", "top", "bottom", "inner" and "outer" are intended to illustrate the positional relationship between the constituent elements with reference to the accompanying drawings, and are merely for ease of description of this specification and simplification of the description, rather than indicating or implying that the device or elements referred to must have a specific orientation or be constructed and operated in a specific orientation, and therefore cannot be construed as limiting the disclosure. The position relationship between the constituent elements is appropriately changed depending on directions of the described constituent elements. Therefore, the position relationship is not limited to the words described in the specification, which may be appropriately replaced depending on the situation.

In this specification, the terms "mount", "connected", and "connect" should be construed in a broad sense, unless otherwise expressly specified and defined. For example, they may be fixed connection, detachable connection, or integral connection; may be mechanical connection or electrical connection; or may be direct connection, indirect connection by means of an intermediate member, or internal communication between two elements. Those of ordinary skill in the art may understand the meanings of the above terms in the disclosure based on the situation.

The contents provided in the implementations of the disclosure have been described in detail above, and the principles and implementations of the disclosure are set out and explained herein. The above descriptions are only used to help understand the method and core idea of the disclosure. In addition, for those of ordinary skill in the art, changes may be made to the specific implementations and application range based on the idea of the disclosure. In conclusion, the contents of this specification should not be construed as a limitation to the disclosure.

What is claimed is:

1. An energy storage device, comprising:
an electrode assembly;
an end cover assembly, the end cover assembly comprising a top cover, a lower plastic member, and a terminal, wherein: the terminal is fixed to the top cover, the top cover comprises a response member, the top cover defines an opening, and the response member is attached to the top cover and covers the opening; and the lower plastic member is arranged between the top cover and the electrode assembly, the lower plastic member comprises a first surface facing the top cover and a second surface facing away from the first surface, the lower plastic member comprises a grid structure, the grid structure defines vent holes extending through the grid structure in a thickness direction of the grid structure, the grid structure is arranged opposite the response member in the thickness direction of the energy storage device, and the vent holes of the grid structure are in communication with the opening of the top cover; and
a current collecting member, the current collecting member comprising a first connecting portion and a second connecting portion connected to the first connecting portion, wherein: the first connecting portion is connected to the terminal, and the second connecting portion is connected to the electrode assembly; a surface of the second connecting portion facing the second surface is provided with welding protrusions, and the second connecting portion at least partially shelters the grid structure; and the grid structure defines an avoidance space dented from the second surface towards the first surface, and all of the welding protrusions are accommodated in the avoidance space;
the avoidance space has a first portion, a second portion, and a third portion, the second portion is connected between the first portion and the third portion, a dented depth of the first portion and a dented depth of the third portion are both less than a dented depth of the second portion, at least part of the welding protrusions faces the second portion in the thickness direction (Z) of the energy storage device, and a height of each of the welding protrusions is less than the dented depth of the second portion and greater than each of the dented depth of the first portion and the dented depth of the third portion, wherein:
the grid structure comprises a plurality of first grids arranged at intervals in a length direction of the lower plastic member; every adjacent two of the first grids surround a space to define the vent hole; and at least part of each of the first grids is bent away from the current collecting member to define the avoidance space.

2. The energy storage device according to claim 1, wherein: each of the plurality of first grids comprises a bent portion and supporting portions arranged on two opposite sides of the bent portion, and the bent portion is bent away from the current collecting member to form the avoidance space.

3. The energy storage device according to claim 2, wherein: the second surface of the lower plastic member defines a recess, the grid structure is arranged in the recess, the first surface of the lower plastic member defines a through hole, the through hole extends through the second surface of the lower plastic member and a bottom wall of the recess, the first grids and side walls of the recess cooperatively define spaces as the vent holes, the supporting portion faces the bottom wall of the recess, and the bent portion faces the through hole.

4. The energy storage device according to claim 3, wherein: the top cover defines a first mounting hole, the lower plastic member defines a second mounting hole corresponding to the first mounting hole, the second mounting hole extends through the first surface and the second surface, the terminal extends through the first mounting hole and the second mounting hole, the side walls of the recess away from the second mounting hole have two chamfers arranged opposite each other in a width direction of the lower plastic member, and one end of the second connecting portion away from the first connecting portion faces the two chamfers.

5. The energy storage device according to claim 3, wherein at least part of the supporting portion abuts against the second connecting portion of the current collecting member.

6. The energy storage device according to claim 3, wherein: the grid structure further comprises a second grid extending in the same direction as the length direction of the lower plastic member, the second grid is connected to all of the plurality of first grids, two opposite ends of the second grid are both connected to the side walls of the recess, and the second grid is entirely bent away from the current collecting member to define the avoidance space.

7. The energy storage device according to claim 6, wherein: the top cover defines a first mounting hole, the lower plastic member defines a second mounting hole corresponding to the first mounting hole, the second mounting hole extends through the first surface and the second surface, the terminal extends through the first mounting hole and the second mounting hole, and in the length direction of the lower plastic member, the one end of the second connecting portion away from the first connecting portion goes beyond one end of the second grid away from the second mounting hole.

8. The energy storage device according to claim 7, wherein the one end of the second connecting portion away from the first connecting portion goes beyond the one end of the second grid away from the second mounting hole by a distance of 1 mm to 12 mm.

9. The energy storage device according to claim 3, wherein the supporting portion is flush with the second surface of the lower plastic member that defines the recess.

10. The energy storage device according to claim 1, wherein an orthographic projection of the current collecting member on the top cover overlaps an orthographic projection of the grid structure on the top cover.

11. The energy storage device according to claim 1, wherein a ratio of a height of the welding protrusions to the maximum dented depth of the grid structure is 0.15-0.95.

12. The energy storage device according to claim 11, wherein the maximum dented depth of the grid structure is 0.05 mm to 1.8 mm.

13. A power consuming apparatus, comprising an energy storage device, the energy storage device being configured to power the power consuming apparatus and comprising:
an electrode assembly;
an end cover assembly, the end cover assembly comprising a top cover, a lower plastic member, and a terminal, wherein the terminal is fixed to the top cover, the top cover comprises a response member, the top cover defines an opening, and the response member is attached to the top cover and covers the opening; and the lower plastic member is arranged between the top cover and the electrode assembly, the lower plastic member comprises a first surface facing the top cover and a second surface facing away from the first surface, the lower plastic member comprises a grid structure, the grid structure defines vent holes extending through the grid structure in a thickness direction of the grid structure, the grid structure is arranged opposite the response member in the thickness direction of the energy storage device, and the vent holes of the grid structure are in communication with the opening of the top cover; and
a current collecting member, the current collecting member comprising a first connecting portion and a second connecting portion connected to the first connecting portion, wherein the first connecting portion is connected to the terminal, and the second connecting portion is connected to the electrode assembly; a surface of the second connecting portion facing the second surface is provided with welding protrusions, and the second connecting portion at least partially shelters the grid structure; and the grid structure defines an avoidance space dented from the second surface towards the first surface, and all of the welding protrusions are accommodated in the avoidance space;
the avoidance space has a first portion, a second portion, and a third portion, the second portion is connected between the first portion and the third portion, a dented depth of the first portion and a dented depth of the third portion are both less than a dented depth of the second portion, at least part of the welding protrusions faces the second portion in the thickness direction of the energy storage device, a height of each of the welding protrusions is less than the dented depth of the second portion and greater than each of the dented depth of the first portion and the dented depth of the third portion, wherein:
the grid structure comprises a plurality of first grids arranged at intervals in a length direction of the lower plastic member; every adjacent two of the first grids surround a space to define the vent hole; and at least part of each of the first grids is bent away from the current collecting member to define the avoidance space.

14. The power consuming apparatus according to claim 13, wherein: each of the plurality of first grids comprises a bent portion and supporting portions arranged on two opposite sides of the bent portion, and the bent portion is bent away from the current collecting member to form the avoidance space.

15. The power consuming apparatus according to claim 14, wherein: the second surface of the lower plastic member defines a recess, the grid structure is arranged in the recess, the first surface of the lower plastic member defines a through hole, the through hole extends through the second surface of the lower plastic member and a bottom wall of the recess, the first grids and side walls of the recess cooperatively define spaces as the vent holes, the supporting portion faces the bottom wall of the recess, and the bent portion faces the through hole.

16. The power consuming apparatus according to claim 15, wherein: the top cover defines a first mounting hole, the lower plastic member defines a second mounting hole corresponding to the first mounting hole, the second mounting hole extends through the first surface and the second surface, the terminal extends through the first mounting hole and the second mounting hole, the side walls of the recess away from the second mounting hole have two chamfers arranged opposite each other in a width direction of the lower plastic member, and one end of the second connecting portion away from the first connecting portion faces the two chamfers.

17. The power consuming apparatus according to claim 15, wherein at least part of the supporting portion abuts against the second connecting portion of the current collecting member.

18. The power consuming apparatus according to claim 15, wherein: the grid structure further comprises a second grid extending in the same direction as the length direction of the lower plastic member, the second grid is connected to all of the plurality of first grids, two opposite ends of the second grid are both connected to the side walls of the recess, and the second grid is entirely bent away from the current collecting member to define the avoidance space.

* * * * *